Nov. 28, 1967  B. VIGNOVICH  3,354,654
RESERVOIR AND METHOD OF FORMING THE SAME
Filed June 18, 1965  2 Sheets-Sheet 1

INVENTOR
BARNEY VIGNOVICH
BY Young & Quigg
ATTORNEYS

Patented Nov. 28, 1967

3,354,654
RESERVOIR AND METHOD OF FORMING
THE SAME
Barney Vignovich, Bartlesville, Okla., assignor to Phillips
Petroleum Company, a corporation of Delaware
Filed June 18, 1965, Ser. No. 465,073
9 Claims. (Cl. 61—.5)

ABSTRACT OF THE DISCLOSURE

A frozen earth storage pit wherein the pit formed by a first shell of frozen, water-saturated earth is insulated by forming a second shell of frozen, water-saturated earth spaced exteriorly from and enclosing the first shell and then removing the water from the water-saturated earth between the two shells or by removing the water-saturated earth from between the shells and replacing it with insulation.

---

This invention relates to the storage of volatile liquids in earthen reservoirs. In one aspect it relates to a method for insulating a reservoir comprising a pit in frozen earth formations that are water permeable and water saturated. In another aspect it relates to a layer of insulating material about the exterior of the frozen earth pit and to a method producing such layer of insulating material. In still another aspect it relates to a method for providing an insulating layer of dry earth about the exterior of a frozen earth reservoir.

The petroleum industry produces great quantities of volatile liquid hydrocarbons as a result of processing crude oil and natural gas. Volatile liquids such as liquefied natural gas, liquefied propane and liquefied butane require enormous storage facilities particularly during periods of slack use. Increased seasonal demand for such products places increased strain on these facilities. Recently open-topped earthen reservoirs have been formed by a ring of freeze pipes sunk into the soil about the area to be excavated, circulating a refrigerant through these pipes until a ring of frozen earth results and then excavating a cavity inside the ring of frozen, water-saturated earth. A vapor-tight roof is then placed over the storage pit and liquefied hydrocarbons are contained therein. Such reservoirs have proved eminently successful and economical for the storage of propane and butane but have not been accepted by the industry for the storage of liquefied natural gas or liquefied ethane or ethylene because the extremely low temperature required to store these liquids at substantially atmospheric pressure requires an excessive amount of refrigeration to lower the temperature of the earthen formation to that required for containing these extremely low temperature boiling liquids.

Broadly the invention contemplates forming a shell of frozen, water-saturated earth about and spaced from the frozen earth shell of a frozen earth reservoir and converting the water-saturated earth between the two shells into a layer of insulation. The preferred method of converting the unfrozen water-saturated earth between the two shells of frozen earth into insulation is to remove the water. The water is replaced by atmospheric air. The thermal conductivity of ice is 1.26, that of water at 32° F. is 0.330 and that of dry sand is 0.18 where thermal conductivity equals B.t.u./(hr.)(sq. ft.) (°F. per ft.). The lower thermal conductivity of dry sand shows the advantage gained by removing the water from the earth surrounding the reservoir. The layer of frozen earth that defines shell forming the reservoir must be kept at about the temperature of the stored liquid, e.g., about −258° F. for natural gas or about −44° F. for propane. The temperature of the barrier wall of frozen earth that surrounds the layer of dry earth will need to be kept only at about 32° F. Therefore it can be seen that the amount of refrigeration required to maintain a frozen earth storage reservoir is very much reduced by practice of my invention.

Instead of removing the water from the layer of earth between the two walls of frozen earth, a gas can be bubbled up through the water-saturated earth so that continued removal of heat will result in formation of frozen bubbles throughout the earth layer between the two frozen walls. A surface active agent can be added with the gas to facilitate stable bubble formation.

If the bottom of the reservoir is in a water-impervious formation such as shale or clay and the frozen walls are perpendicular, the unfrozen earth between the two spaced walls can be excavated and the space filled with conventional insulation such as rock wool, glass wool, expanded mica, foamed plastic, and the like. If a water impervious seal is installed around the exterior of the insulation, the outer ring of frozen earth can be allowed to melt after the insulation is sealed in place.

It is an object of this invention to provide a method for insulating a frozen earth reservoir in earthen formations that are water saturated and water permeable. It is also an object of this invention to provide an insulated frozen earth reservoir so as to reduce refrigeration costs in operating such reservoir. Another object of the invention is to provide a frozen earth reservoir in an earthen formation that is water permeable and water saturated having a layer of dry earth about the exterior of the reservoir and to a method for providing the layer of dry earth. Still another object of the invention is to provide a frozen earth reservoir having a layer of insulation about its exterior. Other objects and advantages of the invention will be apparent to one skilled in the art upon studying the disclosure including the detailed description of the invention and the appended drawing wherein:

Figure 1:
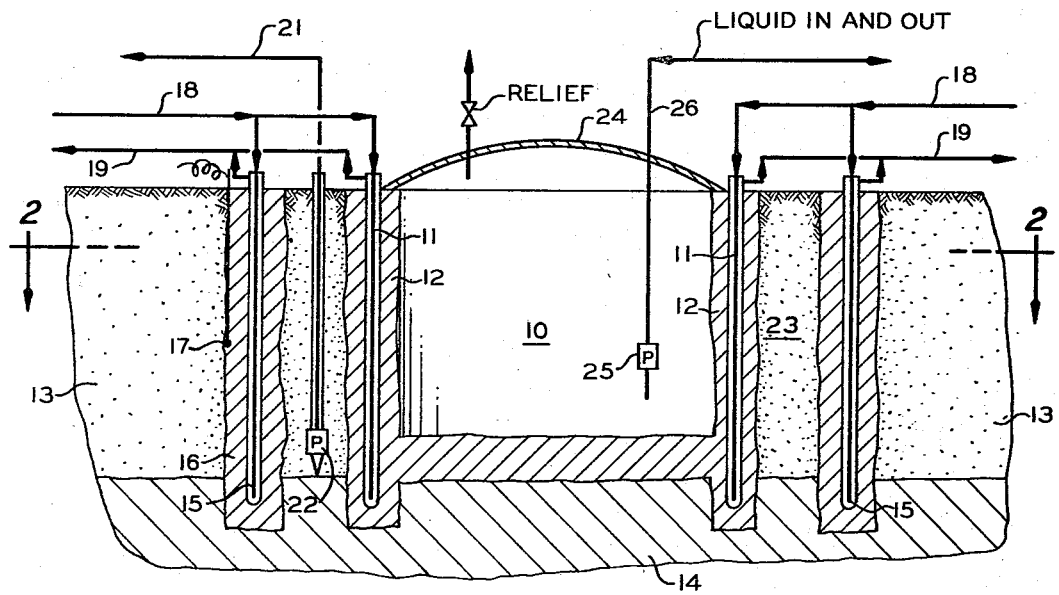
FIGURE 1 is a schematic sectional elevation of one embodiment of the invention.
Figure 2:
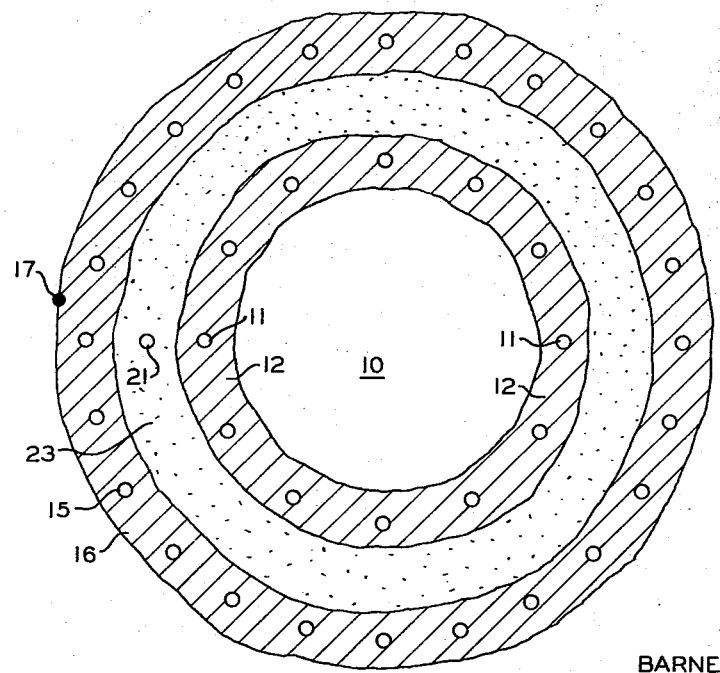
FIGURE 2 is a plan view along line 2—2 of FIGURE 1.

Referring now to FIGURE 1 of the drawing, a frozen earth reservoir 10 is shown in cross section. Freeze pipes 11 are positioned within earth freezing distance from each other in the form of a ring so as to form a first hollow cylinder of frozen earth 12 about the periphery of the reservoir site. Unfrozen earth is removed from the center of the cylinder of frozen earth to form the reservoir 10. The freeze pipes 11 extend downwardly through water-saturated, water-pervious formation 13 into water-impervious formation 14. Freeze pipes 15 are positioned with in earth freezing distance from each other in the form of a second ring so as to form a second hollow cylinder of frozen earth 16 spaced more than earth freezing distance from the exterior of the first hollow cylinder of frozen earth 12. One or more thermocouples 17 is positioned in the water-saturated earth at about the periphery of the second cylinder of frozen earth 16 and connected to an indicator (not shown). The thermocouple 17 provides a measure of the temperature of the earth at about the periphery of the cylinder 16 so that refrigeration can be adjusted to keep this temperature at about 32° F.

Liquid refrigerant is introduced to the freeze pipes via conduit 18 and refrigerant vapors are returned to the refrigeration apparatus (not shown) via conduit 19.

After the cylinders 12 and 16 are formed, a water pipe 21 containing pump 22 is sunk in the water-saturated earth 23 in the annulus between the frozen earth cylinders 12 and 16. The water is pumped out, roof 24 and pump 25 in conduit 26 are installed and the reservoir 10 is ready to be filled.

If bubbles or foam is to provide the insulation instead of the dry earth, the gas can be introduced through the water pipe 21. A plurality of pipes such as pipe 21 will be required.

If commercial insulation is to be used instead of the dry earth, the unfrozen earth in annulus 23 can be excavated and a plastic such as polyurethane can be foamed in place to fill the annulus with foam. The outer cylinder of frozen earth can be allowed to melt. The foam is water impermeable and any water that tends to leak past the foam will be frozen and thus the insulation will be self-sealing. If loose insulation such as glass wool is used, an impermeable barrier will need to be installed to seal out the water when the outer cylinder of frozen earth is allowed to melt.

Figure 3:
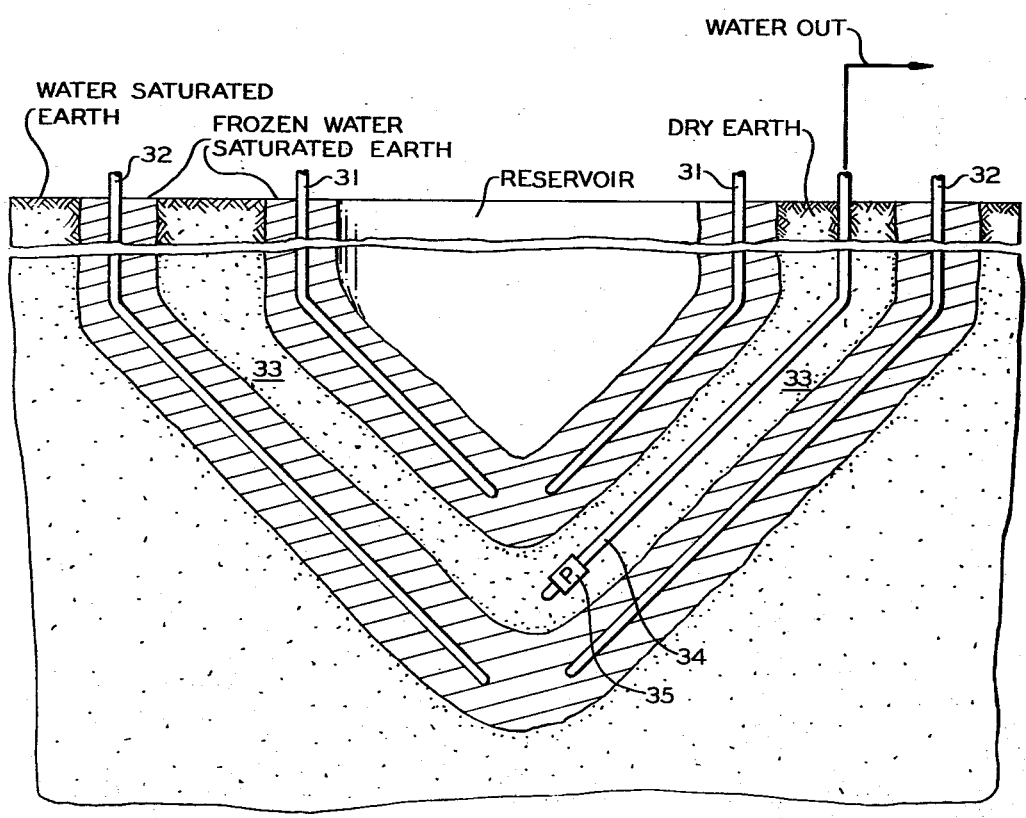
FIGURE 3 is a schematic sectional elevation of another embodiment of the invention.

Frozen earth reservoirs are sometimes constructed in water-saturated, water-permeable earth with no impervious formation underneath, and such reservoirs are formed by freezing the bottom of the pit as well as the walls. Freezing the bottom of the reservoir site is accomplished by directional drilling. Any of several well-known methods of directional drilling can be utilized. FIGURE 3 illustrates a reservoir constructed by drilling vertical freeze pipe holes 31 to about the bottom of the pit site and then drilling to within earth freezing distance from the center of the pit with a whipstock. A second ring of freeze pipe holes 32 is then sunk about the first ring so that when the earth adjacent the freeze pipes is frozen, two concentric shells of frozen earth are formed with a layer of water-saturated earth 33 between them. A water well can then be directionally drilled to a locus near the center of the pit between the two shells of frozen earth, and a water pipe 34 and pump 35 installed to pump the water out.

Alternately gas can be introduced via water pipe 34 to form a layer of frozen foam in the space 33 as freezing of the water-saturated earth is continued.

The invention will now be described as applied to a circular earthen reservoir 95 feet in diameter and 95 feet in depth in a formation where a shale layer is encountered at a depth of about 120 feet and the earth above the shale is water permeable and water saturated. A first 111-foot diameter circle and a second 126-foot diameter circle of freeze pipes are sunk about 150 feet into the earth. Liquid propane refrigerant is supplied to the bottom of the freeze pipes by tubing which extends nearly to the bottom of the freeze pipes. Four equally spaced water wells are drilled midway between the first and second circles of freeze pipes to the layer of shale, and a submergible pump is installed in a water pipe in each of the water wells.

That portion of the freeze pipes and water pipes that projects above the grade level is covered with crushed rock and insulation and freezing is begun. The water pumps are started when thermocouple 17 indicates a temperature of about 32° F. so as to remove as much water from the annulus 23 as practical prior to adding liquid to reservoir 10. Excavation of the reservoir is begun about 2 months after freezing is started.

When the excavation of the reservoir is completed, the roof and service items such as pumps and relief valves are installed. Liquefied natural gas or liquefied methane is then substituted for propane refrigerant in the inner circle of freeze pipes. After about 3 weeks the temperature of the inner frozen earth wall is about −200° F. and liquefied methane is introduced into the reservoir. Vapors are compressed, cooled and returned as liquid to the reservoir. About 3 to 4 weeks are required to fill the reservoir because the reservoir is simultaneously refrigerated and filled.

The freeze pipes are 4-inch pipes and the tubing inside the freeze pipes are 1-inch pipes. The water well pipes are 6-inch and the water pumps have the same outside diameter as the pipes.

According to the practice of my invention a frozen earth reservoir can be cooled down to receive liquefied natural gas in less than half the time that is required to cool down a reservoir having a single frozen earth wall.

That which is claimed is:

1. The method of forming an insulated reservoir in the earth's surface which comprises sinking a first ring of freeze pipes spaced within earth freezing distance of each other about the periphery of the reservoir site downwardly into an earthen formation that is water permeable and water saturated and directionally toward the center of the reservoir site so that the freeze pipes terminate within earth freezing distance from each other below the bottom of the reservoir site; sinking a second ring of freeze pipes spaced within earth freezing distance from each other substantially parallel to and spaced more than earth freezing distance exteriorly from said first ring; circulating refrigerant through said freeze pipes to form a pair of spaced apart and concentric frozen earth vessels in the earth's surface with unfrozen water-saturated earth therebetween; excavating the unfrozen earth from the inner vessel within the first ring of freeze pipes; removing substantially all of the water from the unfrozen earth between the vessels; and placing a roof over the reservoir.

2. The method of forming an insulated reservoir suitable for storing a volatile liquid at substantially atmospheric pressure which comprises sinking a first ring of freeze pipes about the periphery of the reservoir site through a water-saturated, water-permeable formation to a water-impermeable formation; sinking a second ring of freeze pipes about said first ring of freeze pipes spaced more than earth freezing distance exteriorly from and substantially parallel to said first ring; circulating a refrigerant through said freeze pipes to freeze a pair of spaced apart concentric cylindrical shells of frozen earth with frozen water-saturated earth therebetween; excavating the unfrozen earth from within the central shell; removing the water from the unfrozen earth between the spaced shells; placing a roof over the reservoir; and introducing volatile liquid to the reservoir.

3. The method of insulating a frozen earth storage pit wherein the pit is formed by sinking a first plurality of freeze pipes about the periphery of the pit site through water-saturated, water-permeable earth to a sub-surface formation that is water-impermeable, circulating a refrigerant through said freeze pipes to freeze a first cylindrical shell in the earth's surface, and excavating the unfrozen earth within the shell, which method comprises sinking a second plurality of freeze pipes about the periphery of and spaced exteriorly from the first shell of frozen earth to form a second cylindrical shell of frozen earth; circulating a refrigerant through the second plurality of freeze pipes; and removing water from the unfrozen earth between the first and second shells.

4. The method of insulating a frozen earth storage pit where the pit is formed by a first shell of frozen, water-saturated earth which comprises forming a second shell of frozen, water-saturated earth spaced exteriorly from and enclosing said first shell; removing water-saturated earth from the space between said first and second shells; and filling said space with insulation.

5. The method of claim 4 wherein the insulation is polyurethane foam.

6. The method of claim 4 wherein the insulation is a water impermeable, plastic foam; and the second shell is allowed to melt.

7. The method of claim 4 wherein the insulation is glass wool insulation replacing the earth.

8. An insulated earthen reservoir for storage of a volatile liquid at about its boiling temperature comprising a roofed cavity in a first shell of frozen water-saturated, water-permeable earth; a second shell of frozen water-saturated, water-permeable earth spaced exteriorly from said first shell; and a layer of substantially dry earth positioned between said first and second shells.

9. An insulated earthen reservoir for storage of a volatile liquid at about its boiling temperature comprising an open-topped cavity in frozen, water-saturated earth; a first ring of freeze pipes disposed about the periphery of said cavity extending downwardly into the earth and inwardly toward the center of the cavity; a second ring of freeze pipes disposed substantially parallel to said first ring and spaced from said first ring more than earth freezing distance exteriorly from said first ring; means to supply refrigerant to said freeze pipes; pump means for removing water from the unfrozen earth between said rings of freeze pipes; an insulated roof covering said cavity; and means to add volatile liquid to and withdraw volatile liquid from said cavity.

References Cited

UNITED STATES PATENTS

| | | | |
|---|---|---|---|
| 363,419 | 5/1887 | Poetsch | 61—36.1 |
| 3,064,436 | 11/1962 | Loofbourow | 61—.5 |
| 3,241,274 | 6/1966 | Proctor et al. | 61—.5 X |
| 3,271,962 | 9/1966 | Dahms et al. | 61—36.1 |
| 3,292,377 | 12/1966 | Sanger | 61—.5 |

FOREIGN PATENTS

| | | |
|---|---|---|
| 148,614 | 2/1904 | Germany. |
| 111,569 | 3/1962 | Pakistan. |

EARL J. WITMER, *Primary Examiner.*